United States Patent [19]
Nagatani et al.

[11] Patent Number: 5,863,114
[45] Date of Patent: Jan. 26, 1999

[54] LIGHT EMISSIVE PANEL UNIT

[75] Inventors: Shinpei Nagatani; Fumiaki Yamada; Masaki Miyahara; Motohiko Fukuhara; Katsunori Tanaka, all of Kawasaki, Japan

[73] Assignee: Fujitsu Limited, Kawasaki, Japan

[21] Appl. No.: 206,145

[22] Filed: Mar. 7, 1994

[30] Foreign Application Priority Data

Mar. 9, 1993 [JP] Japan .................................. 5-048365

[51] Int. Cl.⁶ .................................................. F21V 5/02
[52] U.S. Cl. ........................... 362/328; 362/27; 362/331; 362/339
[58] Field of Search .................. 362/31, 26, 27, 362/331, 309, 333, 328, 329, 330, 334, 339, 335, 336, 337; 359/48, 42, 49, 50

[56] References Cited

U.S. PATENT DOCUMENTS

| | | | |
|---|---|---|---|
| 4,791,540 | 12/1988 | Dreyer, Jr. et al. | 362/31 X |
| 4,913,529 | 4/1990 | Goldenberg et al. | 350/337 |
| 5,136,480 | 8/1992 | Pristash et al. | 362/31 |
| 5,386,347 | 1/1995 | Matsumoto | 362/26 X |
| 5,394,255 | 2/1995 | Yokota et al. | 362/31 X |
| 5,408,388 | 4/1995 | Kobayashi et al. | 362/31 |
| 5,414,599 | 5/1995 | Kaneko et al. | 362/27 |

FOREIGN PATENT DOCUMENTS

| | | |
|---|---|---|
| 59-139020 | 8/1984 | Japan . |
| 62-002231 | 1/1987 | Japan . |
| 2-055326 | 2/1990 | Japan . |
| 2-239219 | 9/1990 | Japan . |

*Primary Examiner*—Ira S. Lazarus
*Assistant Examiner*—Thomas M. Sember
*Attorney, Agent, or Firm*—Staas & Halsey

[57] ABSTRACT

A light emissive panel unit includes a light source for emitting light, a prism plate into which the light emitted by the light source means incident, a part of the light being reflectable and another part of the light passing through the prism plate, and an adjusting element for partially adjusting an amount of light emitted from a surface of the prism plate.

35 Claims, 14 Drawing Sheets

$\theta = 90°$
$a = 45°$
$p = 0.35\,mm$ $a1 < a$ $a2 < a$ 5,863,114

LIGHT EMISSIVE PANEL UNIT

BACKGROUND OF THE INVENTION

1. Field of the Invention

The present invention relates to a light emissive panel unit used as a surface light source unit and a display panel unit.

2. Description of the Related Art

FIG. 1 shows a conventional surface light source unit disclosed in Japanese Laid Open Patent Application No. 2-157791. Referring to FIG. 1, a surface light source unit 10 has a plate body 11 and cold-cathode lamps 12 facing side edge surfaces of the plate body 11. The plate body 11 has a light guide plate 13 made of acrylic resin, a light diffusing plate 14 and a reflecting plate 16. The light diffusing plate 14 is provided on a surface of the light guide plate 13. The reflecting plate 16 is provided with a diffusive reflecting layer 15 formed on a surface thereof. The reflecting plate 16 is provided on another surface of the light guide plate 13 such that the diffusive reflecting layer 15 is on the surface of the light guide plate.

In the surface light source unit shown in FIG. 1, light emitted from the cold-cathode lamps 12 is shut into the light guide plate 13 and is repeatedly reflected by the diffusive reflecting layer 15 and the boundary between the surface of the light guide plate 13 and the light diffusing plate 14. While the light is being repeatedly reflected, a part of the light shut in the light guide plate 13 is emitted through the light diffusing plate 14. As a result, the surface of the diffusing plate 14 uniformly lights.

The conventional surface light source unit described above must have the light guide plate 13 which is solid. Thus, the surface light source unit is relatively heavy. In addition, it is difficult to adjust the brightness of the surface light source unit.

SUMMARY OF THE INVENTION

Accordingly, a general object of the present invention is to provide a novel and useful light emissive panel unit in which the disadvantages of the aforementioned prior art are eliminated.

A more specific object of the present invention is to provide a light emissive panel unit having a light weight.

Another object of the present invention is to provide a light emissive panel unit by which the brightness can be easily adjusted.

The above objects of the present invention are achieved by a light emissive panel unit comprising: light source means for emitting light; a prism plate to which the light emitted by the light source means is made incident, a part of the light being reflectable by the prism plate and another part of the light passing through the prism plate; and adjusting means for partially adjusting an amount of light emitted from a surface of the prism plate.

The light emissive panel unit may form a surface light source unit in which the amount of light emitted from the surface of the prism plate is partially adjusted by the adjusting means so as to be substantially uniform.

The light emissive panel unit may also form a display panel unit in which the amount of light emitted from the surface of the prism plate is partially adjusted by the adjusting means so that image patterns are formed on the surface of the prism plate.

According to the present invention, since the light emissive panel can be formed without the light guide plate, the light emissive panel can made lighter. In addition, since the amount of light emitted from the surface of the plate prism is partially adjusted by the adjusting means, the brightness of the light emissive panel can be easily adjusted.

Additional objects, features and advantages of the present invention will become apparent from the following detained description when read in conjunction with the accompanying drawings.

DESCRIPTION OF THE PREFERRED EMBODIMENTS

A description will now be given of a surface light source unit according to a first embodiment of the present invention.

Figure 1:
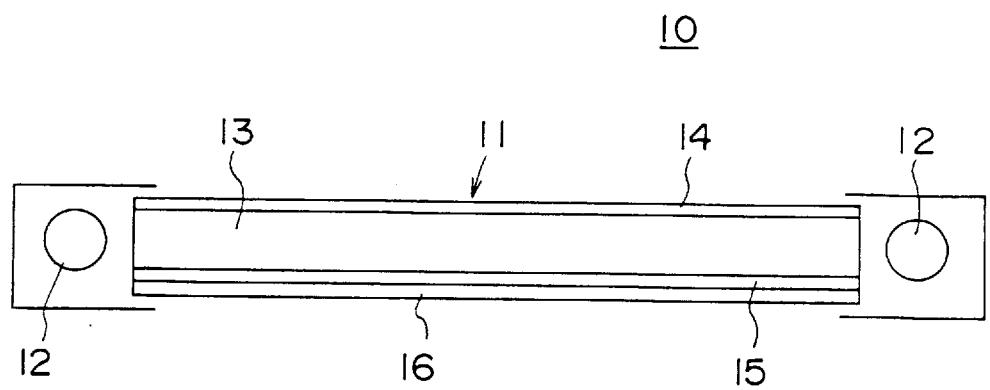
FIG. 1 is a diagram illustrating a conventional surface light source unit.
Figure 2:
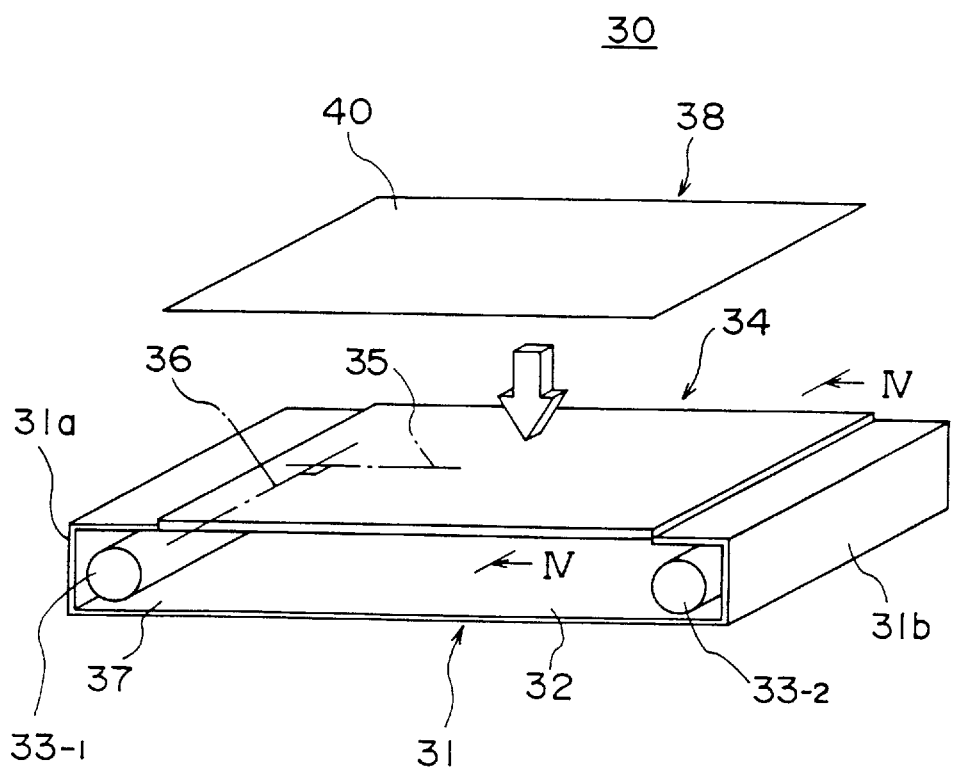
FIG. 2 is a diagram illustrating a surface light source unit according to a first embodiment of the present invention.

A surface light source unit is formed, for example, as show in FIG. 2. Referring to FIG. 2, a surface light source 30 has a body 31 and a prism plate 34. The body 31 is formed of a rectangular shaped reflector 32 and holders 31a and 31b provided at both sides of the reflector 32 so that an opening facing the reflector 32 is formed between the holders 31a and 31b. The reflector 32 is provided with an aluminum sheet having a thickness of 0.5 mm on the surface thereof, a silver thin film being placed on the surface the aluminum sheet. The holders 31a and 31b respectively house cold-cathode lamps 33-1 and 33-2 so that the cold-cathode lamps 33-1 and 33-2 face each other. Each of the cold cathode tubes 33-1 and 33-2 is a cylindrical tube having, for example, a diameter of 3 φ and a length of 240 mm. The prism plate 34 is mounted between the holders 31a and 31b so as to cover the opening in the body 31, so that a space 37 is formed between the prism plate 34 and the reflector 32.

Figure 3:
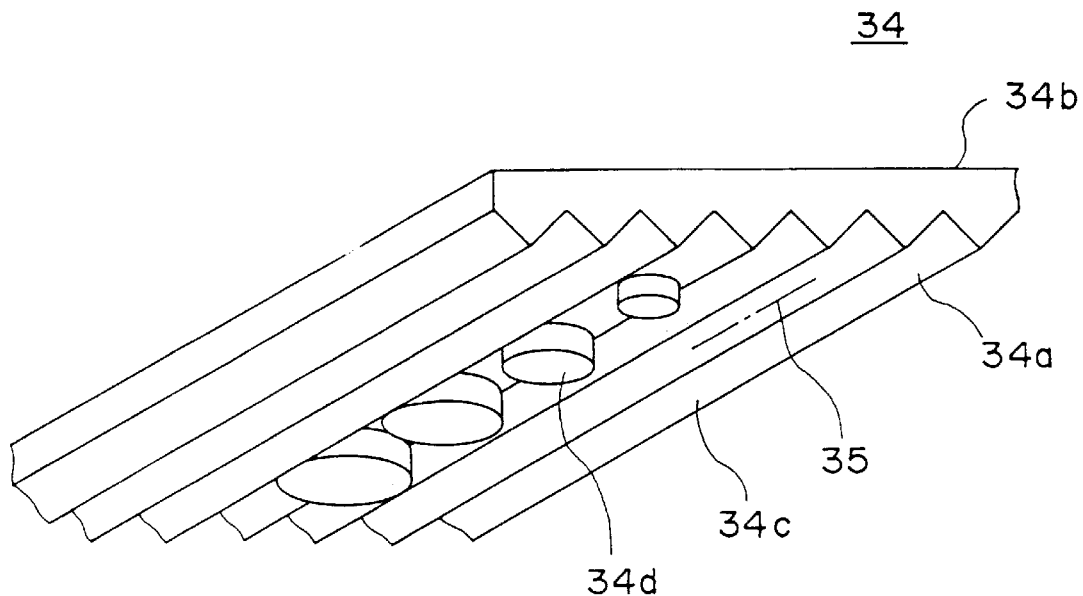
FIG. 3 is a perspective view illustrating the structure of a prism plate provided in the surface light source unit shown in FIG. 2.
Figure 4:
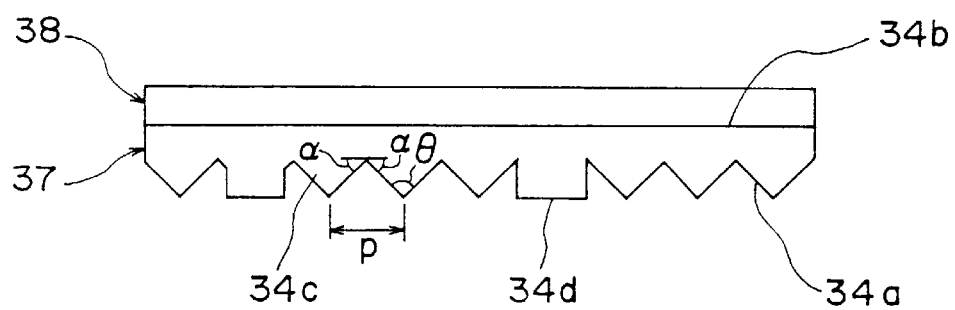
FIG. 4 is a cross sectional view, taken along line IV–IV shown in FIG. 2, illustrating the prism plate.

The prism plate 34 is a clear plate made of polycarbonate resin, and a thickness thereof is, for example, 0.36 mm. The prism plate is formed, for example, as shown in FIGS. 3 and 4. The prism plate 34 has a prism surface 34a and a flat surface 34b which are opposite to each other. On the prism surface 34a, a plurality of linear prisms 34c are formed so as to be parallel to each other at intervals of, for example, 0.35 mm (p=0.35 mm). A vertical angle Θ of each of the linear prisms 34c is equal to 90° (Θ=90°), and a prism angle α (the base angle) of each of the linear prisms 34c is equal to 45° (α=45°). A plurality of small cylindrical blocks 34d are formed at predetermined positions on the prism surface 34a so that the prism surface 34a is dotted with the small cylindrical blocks 34d. Dots made of acrylate clear resin having a ultraviolet-setting property are printed on the prism surface 34a and are then hardened, so that the small cylindrical blocks 34d are formed on the prism surface 34a.

The prism plate 34 is mounted on the body 31 of the surface light source unit 30 so that the prism surface 34a faces the reflector 32. In addition, the direction of the prism plate 34 is adjusted so that a line 35 parallel to a direction in which each of the linear prisms 34c extends is perpendicular to a line 36 parallel to a direction in which each of the cold-cathode lamps 33-1 and 33-2 extends.

A light diffusion plate 38 is formed on the flat surface 34b of the prism plate 34. The light diffusion plate 38 is formed of a clear resin film on which glass beads are scattered, the clear resin having a thickness, for example, of 0.25 mm. A surface of the light diffusion plate 38 is a lighting surface 40 of the surface light source unit 30.

Figure 5:
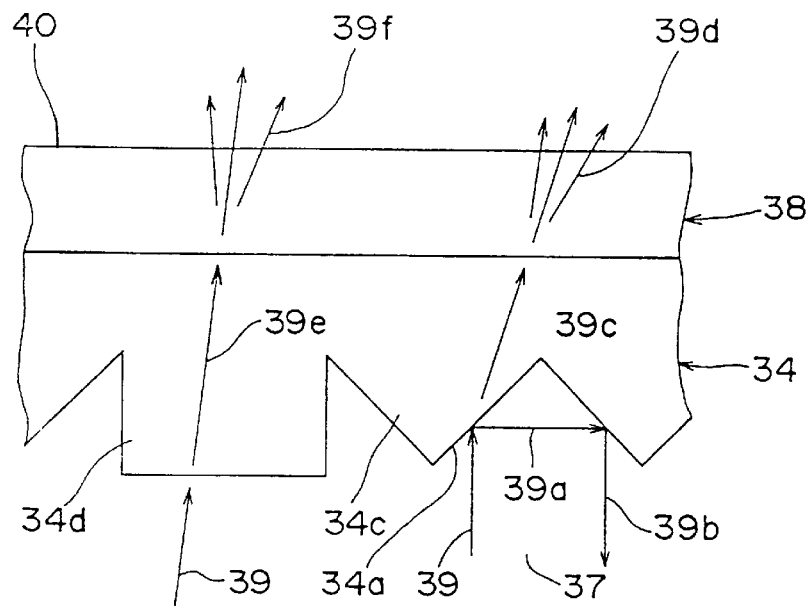
FIG. 5 is a diagram illustrating a function of the prism plate.

In the surface light source unit 30 having the above structure, a light 39 emitted from the cold-cathode lamps 33-1 and 33-2 is incident to the prism surface 34a of the prism plate 34 as shown in FIG. 5. Referring to FIG. 5, when the light 39 is incident to each of the linear prisms 34c, a part 39a of the light 39 is reflected twice by adjacent surfaces of the linear prisms 34c producing reflected beams 39a and 39b. The twice reflected light 39b then travels in the space 37 toward the reflector 32. Another part 39c of the light 39 incident to each of the linear prisms 34 travels through the prism plate 34, this light being incident on the light diffusion plate 38. The light traveling through the light diffusion plate 38 is diffused by the light diffusion plate 38. The diffused light 39 is then emitted from the lighting surface 40.

The light 39a reflected by the surfaces of the linear prisms 34c travels in the space 37 and is reflected by the reflector 32. That is, the light 39a is repeatedly reflected by the prism surface 34a and the reflector 32 so that the light 39a is confined in the space 37. While the light 39a is being repeatedly reflected in the space 37, a parts 39c and 39e of the light 39 are made incident on the prism plate 34 and are emitted as beams 39d and 39f, respectively, through the lighting surface 40.

Figure 6:
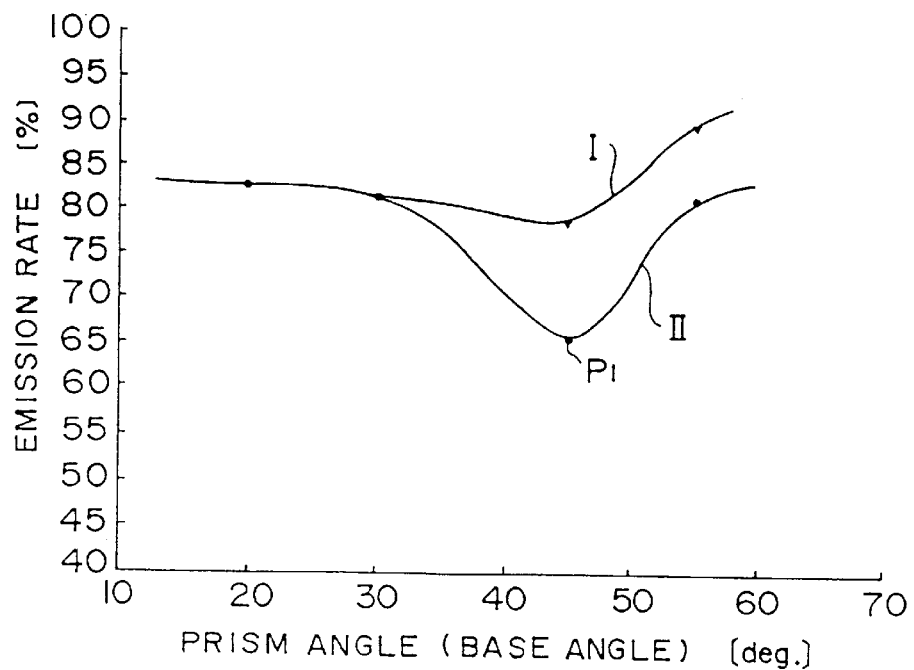
FIG. 6 is a graph illustrating a relationship between a emitting rate and a prism angle (a base angle) with a parameter of a direction in which the prism plate is arranged.

FIG. 6 indicates relationships between the prism angle α of each of the linear prisms 34c and the emitting rate (%), which relationships were obtained by experiments using the surface light source unit 30 as shown in FIG. 2. In these experiments, no small cylindrical blocks were formed on the prism surface 34a of the prism plate 34. Referring to FIG. 6, a first curve I indicates a relationship between the prism angle α and the emitting rate under a condition in which the prism plate 34 was mounted on the body 31 so that the line parallel to the direction in which each of the linear prisms 34c extends is parallel to the line parallel to the direction in which each of the cold-cathode lamps 33-1 and 33-2 extends. A second curve II indicates a relationship between the prism angle α and the emitting rate under a condition in which the prism plate 34 is mounted on the body 31 so that the line parallel to a direction in which each of the linear prisms 34c extends is perpendicular to the line 35 parallel to the direction in which each of the cold-cathode lamps 33-1 and 33-2 extends. In FIG. 6, a 100% emitting rate means a state in which the prism plate 34 is removed from the body 31 so that the light is not confined in the space 37, and a 0% emitting rate means a state in which an opaque is substituted for the prism plate 34 so that none of the light is emitted through the lighting surface 40. Further, an 80% emitting rate means that 20% of the light is confined in the space 37. With reference to the first curve I and the second curve II in FIG. 6, in a case where the prism plate 34 is mounted on the body 31 so that the line 35 parallel to the direction in which each of the linear prisms 34c extends is perpendicular to the line 36 parallel to the direction in which each of the cold-cathode lamps 33-1 and 33-2 extend and the prism angle α is equal to 45°, the lowest emission rate of 65% is obtained. That is, in this case, the light is most effectively confined in the space 37 between the prism plate 34 and the reflector 32.

The arrangement and the structure of the prism plate 34 of the surface light source unit 30 shown in FIG. 2 were decided on, based on the results of the above experiments.

On the other hand, a great part 39e of the light incident to each of the small cylindrical blocks 34d travels through the prism plate 34 and is further incident into the light diffusion plate 38. The light 39e incident into the diffusion plate 38 is diffused thereby and diffused light 39f is then emitted from the lighting surface 40 of the surface light source unit 30. That is, the small cylindrical blocks 34d lower the function, by which the light is reflected, of the prism plate 34. Thus, due to using the small cylindrical blocks 34d, the emission rate of the prism plate 34 can be partially adjusted.

Figure 7:
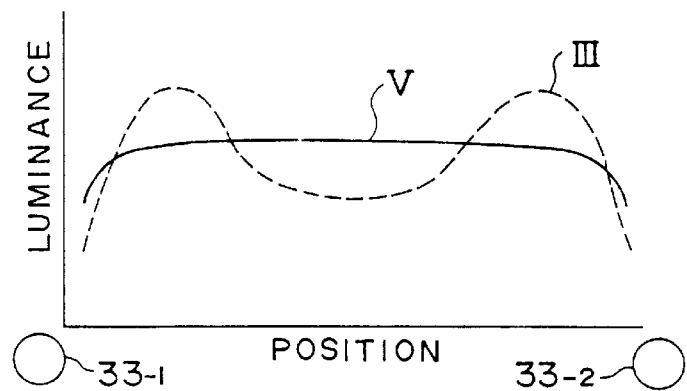
FIG. 7 is a graph illustrating a brightness distribution on a lighting surface of the surface light source unit.

On the lighting surface 40 of the surface, luminance of an area near a lamp is higher than that of an area away from the lamp. Thus, if there is no small cylindrical block lowering the function of the prism plate 34, the luminance distribution on the lighting surface 40 in a direction perpendicular to a direction in which each of the cold-cathode lamps 33-1 and 33-2 is formed as shown by a curve III in FIG. 7. In the embodiment, the small cylindrical blocks 34d are formed on the prism surface 34a so that a number of small cylindrical blocks 34d in an area away from each of the cold-cathode lamps 33-1 and 33-2 is greater than a number of those in an area near each of the cold-cathode lamps 33-1 and 33-2. Thus, the emission rate in the area away from each of cold-cathode lamps 33-1 and 33-2 is increased, and the emission rate in the area near each of cold-cathode lamps 33-1 and 33-2 is decreased. As a result, the luminance distribution on the lighting surface 40 is formed as shown by a curve V in FIG. 7 so that the lighting surface 40 uniformly lights.

Figure 8:
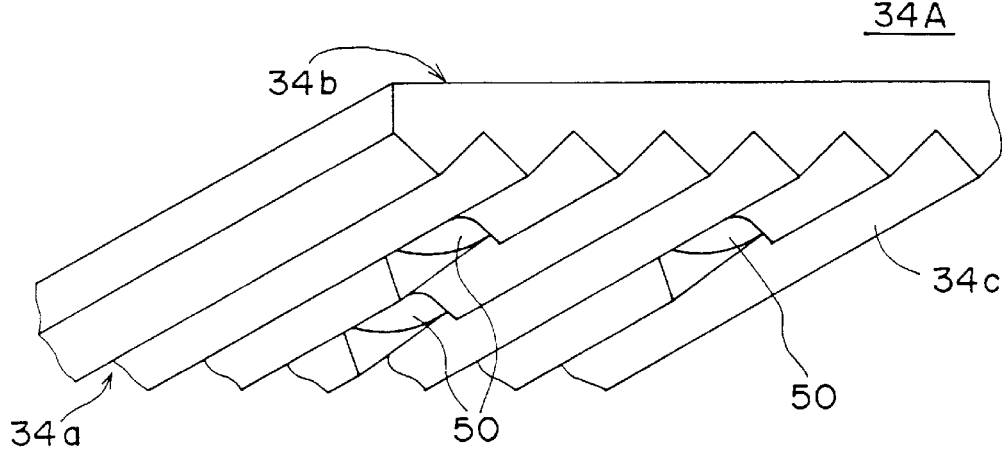
FIG. 8 is a perspective view illustrating a first modification of the prism plate.

A prism plate 34A shown in FIG. 8 may be substituted for the prism plate 34 shown in FIGS. 2 and 3. Referring to FIG. 8, small holes 50 are formed on the prism surface 34a instead of the small cylindrical blocks 34d. In a case where the prism plate 34A is mounted on the body 31 of the surface light source unit 30 as shown in FIG. 2, the light passes through the small holes 50. Thus, an amount of light reflected by an area on which the small holes 50 are formed is decreased, and so the emission rate of this area is increased. That is, due to using the small holes 50, the brightness of the lighting surface 40 can be partially adjusted.

Figure 9:
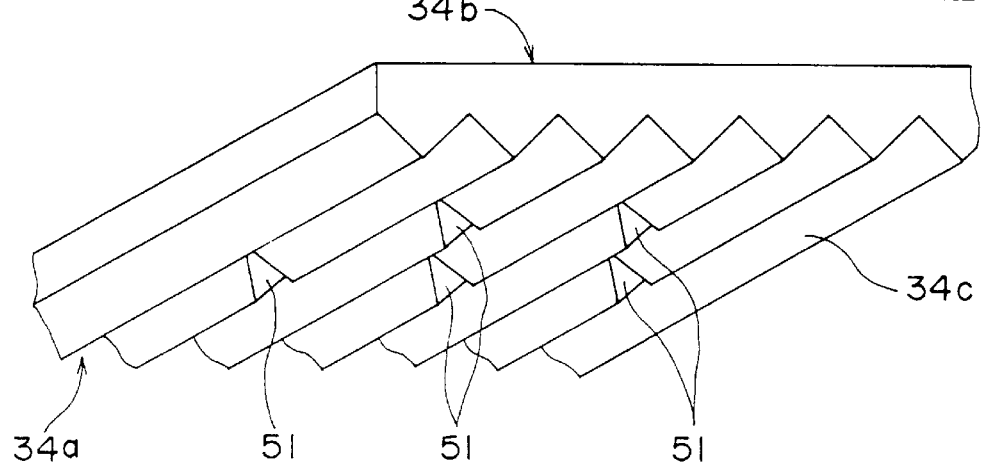
FIG. 9 is a perspective view illustrating a second modification of the prism plate.

A prism plate 34B shown in FIG. 9 may be also substituted for the prism plate 34 shown in FIGS. 2 and 3. Referring to FIG. 9, small notches 51 are formed on the prism surface 34a of the prism plate 34B instead of the small cylindrical blocks 34d. In a case where the prism plate 34B is mounted on the body 31 of the surface light source unit 30 as shown in FIG. 2, the light passes through the small notches 51. Thus, an amount of light reflected by an area on which the small notches 51 are formed is decreased, and so the emission rate of this area is increased. That is, due to using he small notches 51, the brightness of the lighting surface 40 can be partially adjusted.

Figure 10:
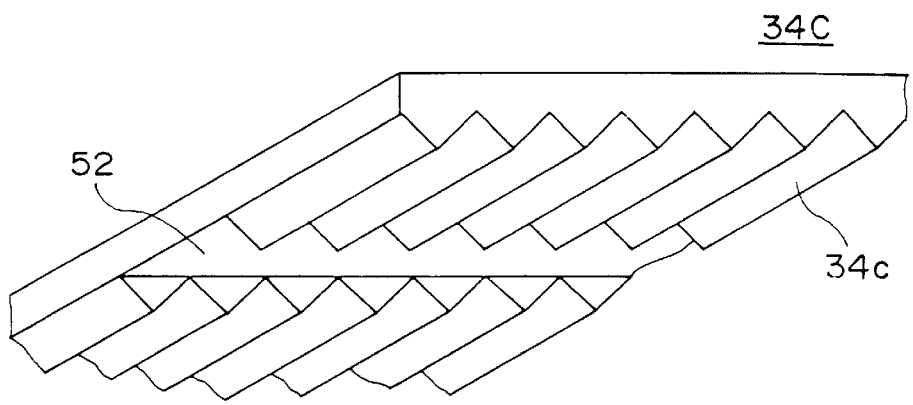
FIG. 10 is a perspective view illustrating a third modification of the prism plate.

A prism plate 34C shown in FIG. 10 may be also substituted for the prism plate 34 shown in FIGS. 2 and 3. Referring to FIG. 10, a flat surface 52 is formed on the prism surface 34a having the linear prisms 34. The flat surface is located at a center of the prism plate 34C and extends in a direction perpendicular to a direction in which each of the linear prisms 34c extends, which center is a position away from each of the cold-cathode lamps 33-1 and 33-2. The light incident to the flat surface 52 passes through the prism plate 34C. The emission rate of an area on which the flat surface 52 is formed can be increased.

Figure 11:
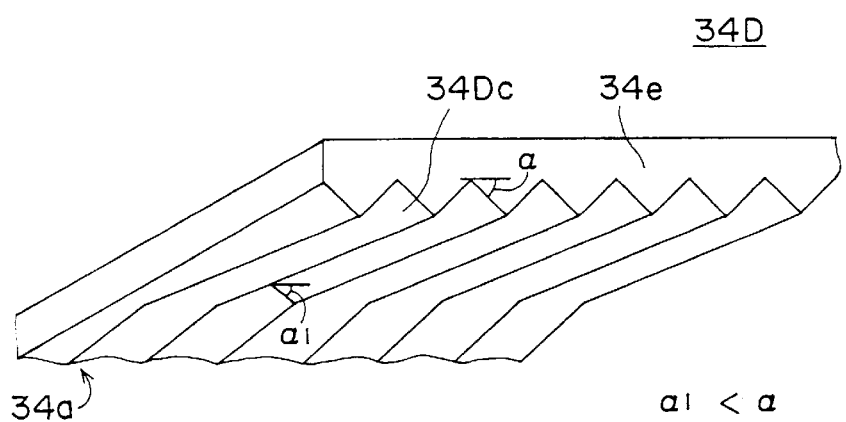
FIG. 11 is a perspective view illustrating a fourth modification of the prism plate.

A prism plate 34D shown in FIG. 11 may be also substituted for the prism plate 34 shown in FIGS. 2 and 3.

Figure 12:
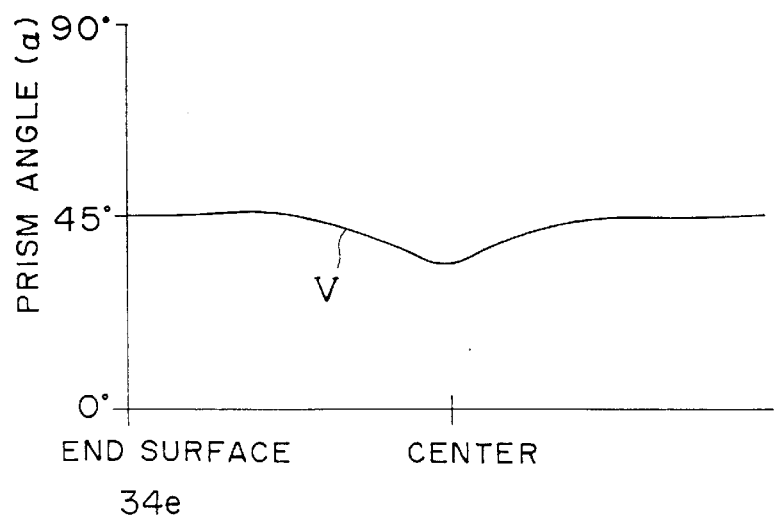
FIG. 12 is a graph illustrating variation of the prism angle in a direction in which each prism convex part extends in the prism panel show in FIG. 11.

Referring to FIG. 11, the prism angle α of each of the linear prisms 34Dc formed on the prism surface 34a of the prism plate 34D continuously varies as shown in FIG. 12. That is, the prism angle of each of the linear prisms 34Dc is continuously decreased from 45° (=α) so that the farther from an end surface 34e which is the nearest each of the cold-cathode lamps 33-1 and 33-2, the smaller the prism angle (α1<α), as shown by a curve V in FIG. 12. According to the curve II shown in FIG. 6, the smaller the prism angle α, the larger the emission rate. Thus, in the surface light source unit 30 having the prism plate 34D, the farther from each of the cold-cathode lamps 33-1 and 33-2, the larger the emission rate, so that the brightness of the lighting surface 40 can be uniform.

Figure 13:
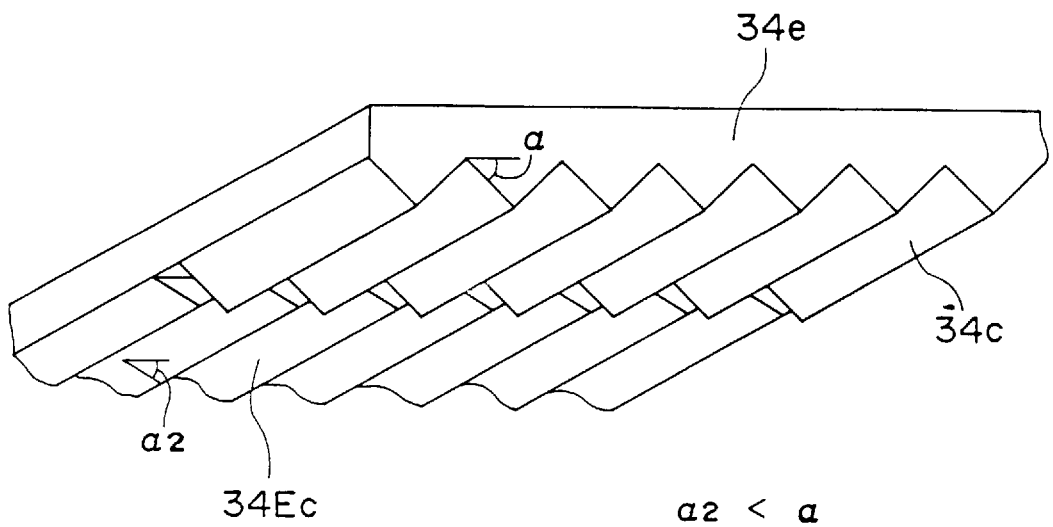
FIG. 13 is a perspective view illustrating a fifth modification of the prism plate.

A prism plate 34E shown in FIG. 13 may be also substituted for the prism plate 34 shown in FIGS. 2 and 3. Referring to FIG. 13, each of the linear prisms 34c is divided into a first portion near the end surface 34e which is nearest each of the cold-cathode lamps 33-1 and 33-2 and a second portion away from the end surface 34e. The prism angle α of the first portion is greater than the prism angle α2 of the second portion. In this case, the emission rate of the first portion of each of the linear prisms 34c, which portion is near each of the cold-cathode lamps 33-1 and 33-2, is less than the emission rate of the second portion each thereof. Thus, the brightness of the lighting surface 40 can be uniform.

Figure 14:
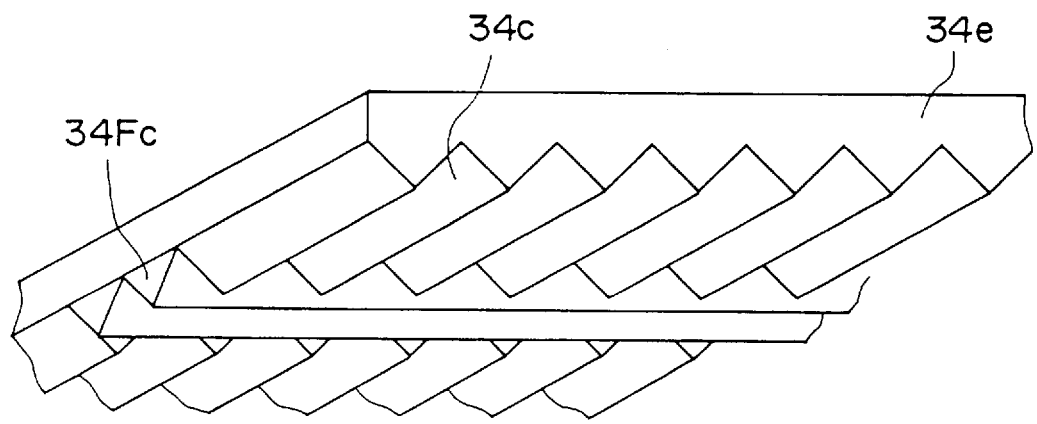
FIG. 14 is a perspective view illustrating a sixth modification of the prism plate.

A prism plate 34F shown in FIG. 14 may be also substituted for the prism plate 34 shown in FIGS. 2 and 3. Referring to FIG. 14, second linear prisms 34Fc which extend in a direction parallel to the end surface 34e of the prism plate 34F are formed on the prism surface 34a so as to cross first linear prisms 34c which extend in a direction perpendicular to each of the end surfaces 34e. The second linear prisms 34Fc are located at positions at which the emission rate should be increased.

In the surface light source unit 30 having the prism plate 34F shown in FIG. 14, the first linear prisms 34c extend in a direction perpendicular to a direction in which each of the cold-cathode lamps 33-1 and 33-2 extend, and the second linear prisms 34Fc extend in a direction parallel to the direction in which each of the cold-cathode lamps 33-1 and 33-2. According to the curves I and II shown in FIG. 6, the emission rate of the linear prism extending in a direction parallel to each of the cold-cathode lamps 33-1 and 33-2 is greater than that of the linear prism extending in a direction perpendicular to each of the cold-cathode lamps 33-1 and 33-2. Thus, the emission rate of the prism plate can be partially increased by the second linear prisms 34Fc so that the brightness of the lighting surface 40 can be uniform.

Figure 15:
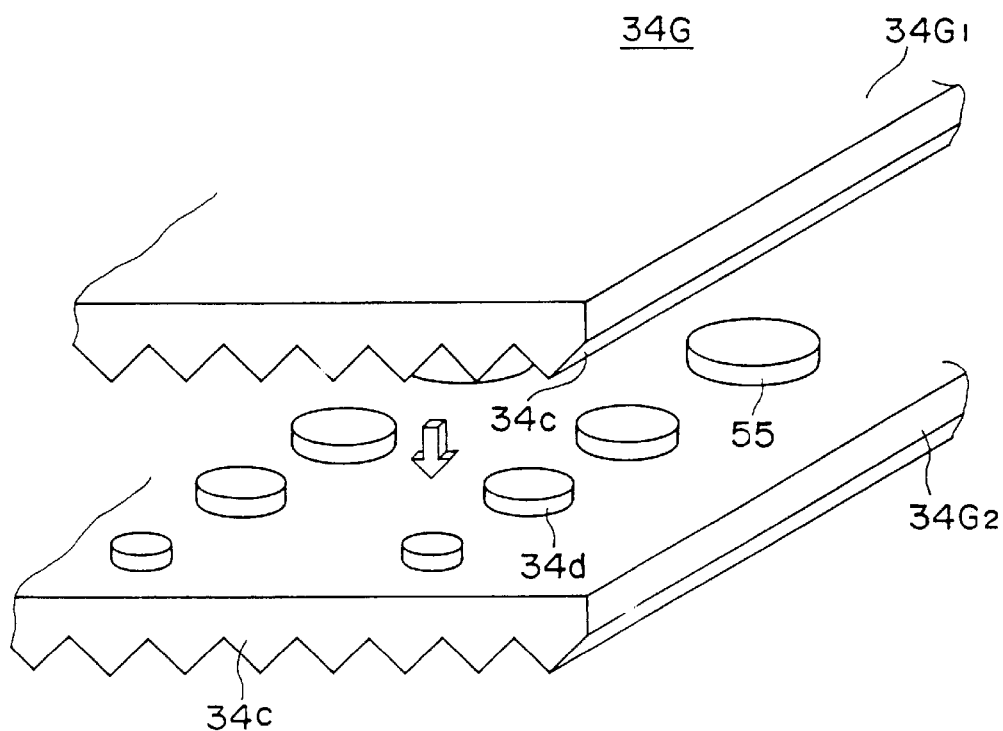
FIG. 15 is a perspective view illustrating a seventh modification of the prism plate.

A prism plate 34G shown in FIG. 15 may be also substituted for the prism plate 34 shown in FIGS. 2 and 3. Referring to FIG. 15, the prism plate 34G is formed of two prism layers 34G1 and 34G2, each of which has the same structure as the prism plate 34 shown in FIG. 3. The prism layers 34G1 and 34G2 are adhered by clear resin blocks 55 which are printed so as to be dotted on the prism layers 34G1 and 34G2. In the prism plates 34G formed of the two prism layers 34G1 and 34G2, the emission rate is decreased. As a result, a range in which the emission rate can be partially controlled by the small cylindrical blocks 34d can extend.

Figure 16:
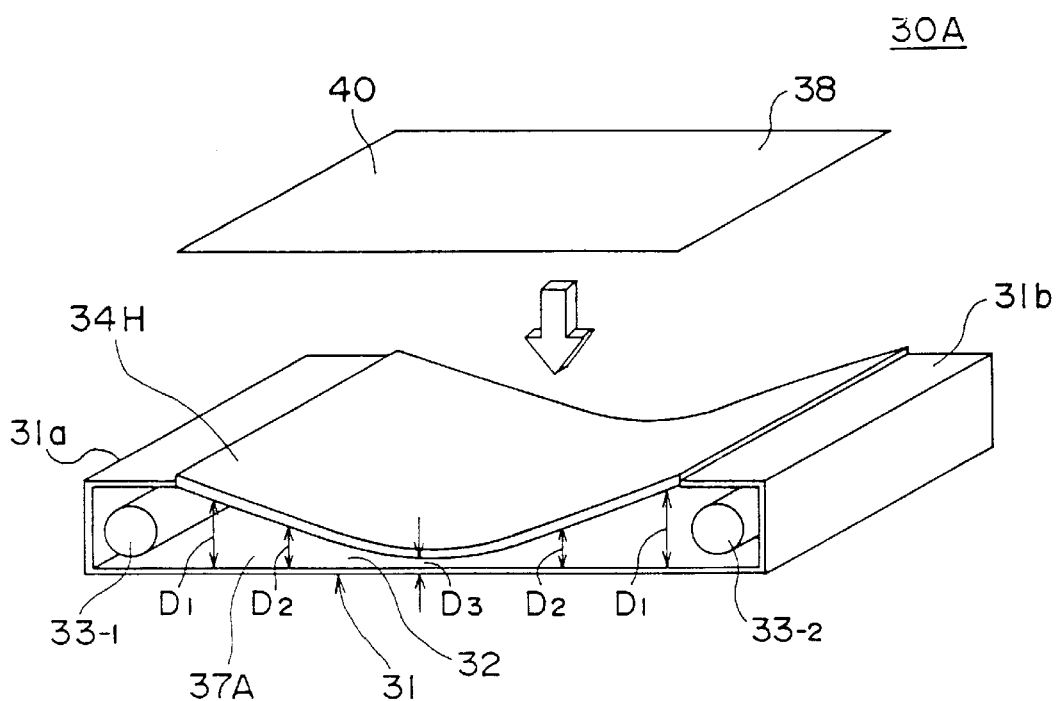
FIG. 16 is a diagram illustrating the surface light source unit according to a second embodiment of the present invention.

A surface light source unit according to a second embodiment of the present invention is formed as shown in FIG. 16. In FIG. 16, those parts which are the same as those shown in FIG. 2 are given the same reference numbers.

Referring to FIG. 16, the surface light source unit 30A has a curved prism plate 34H which is mounted on the holders 31a and 31b of the body 31 so that the distance between the prism plate 34H and the reflector 32 is decreased with going away from each of the cold-cathode lamps 33-1 and 33-2, as shown by D1, D2 and D3. That is, a space 37A formed between the curved prism plate 34H and the reflector 32 becomes narrower with going away from each of the cold-cathode lamps 33-1 and 33-2.

In the surface light source unit 30A having the above structure, since the space 37A between the curved prism plate 34H and the reflector 32 becomes continuously narrower with going away (i.e., at increased structures) from each of the cold-cathode lamps 33-1 and 33-2, the number of times by which the light emitted from each of the cold-cathode lamps 33-1 and 33-2 is reflected by the reflector 32 and the curved prism plate 34H is progressively less than the number of times in the surface light source unit 30 shown in FIG. 2. Each time a light is reflected by a surface of a medium, a part of the light is absorbed by the medium and the intensity of the reflected light is reduced. In a case, for example, where the light is reflected by the surface of the medium having a reflection coefficient of 94% eleven times, the intensity I of the reflected light becomes about half ($0.94^{11}$I=0.51 I). In the surface light source unit 30A shown in FIG. 16, since the number of times by which the light is reflected by the reflector 32 and the curved prism plate 34H is small, the quantity of light reduced in the space 37A is also small. Thus, the brightness of the lighting surface 40 is higher than that in a case of the surface light source unit 30 shown in FIG. 2.

Figure 17:
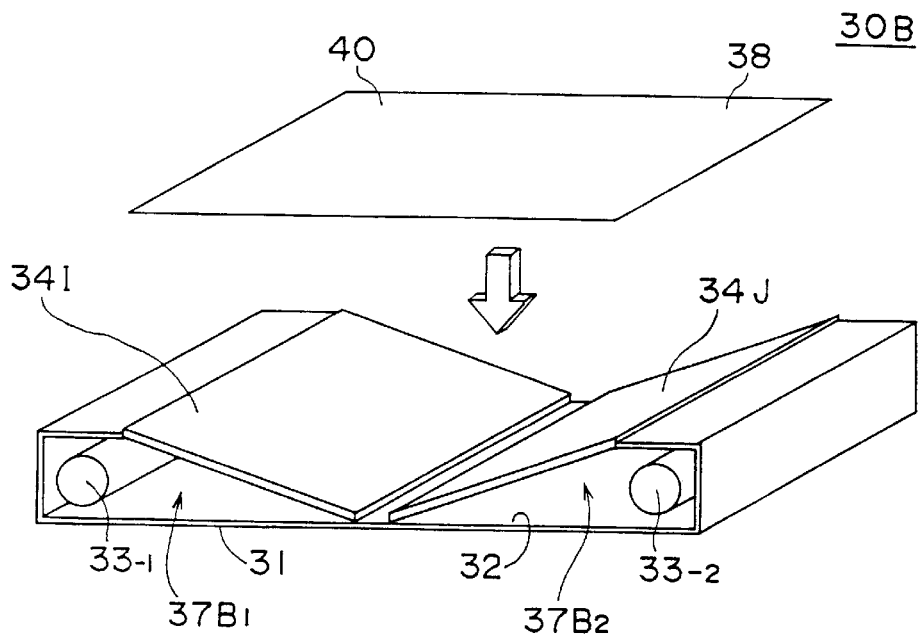
FIG. 17 is a diagram illustrating the surface light source unit according to a third embodiment of the present invention.

A surface light source unit according to a third embodiment of the present invention is formed as shown in FIG. 17.

Referring to FIG. 17, a surface light source unit 30B has two prism plates 34I and 34J which are inclined on the body 31 so that spaces 37A and 37B respectively formed between the reflector 32 and the prism plates 34I and 34J becomes narrower with going away from the cold-cathode lamps 33-1 and 33-2. Thus, the number of times by which the light reflected in the spaces 34I and 34J is reduced in the same manner as that in a case of the surface light source unit 30A shown in FIG. 16. That is, the brightness of the lighting surface 40, which is a surface of the light diffusion plate 38 formed on the prism plates 34I and 34J, can be improved. In addition, since both the prism plates 34I and 34J are flat, and thus not curved, it is easy to make them.

Figure 18:
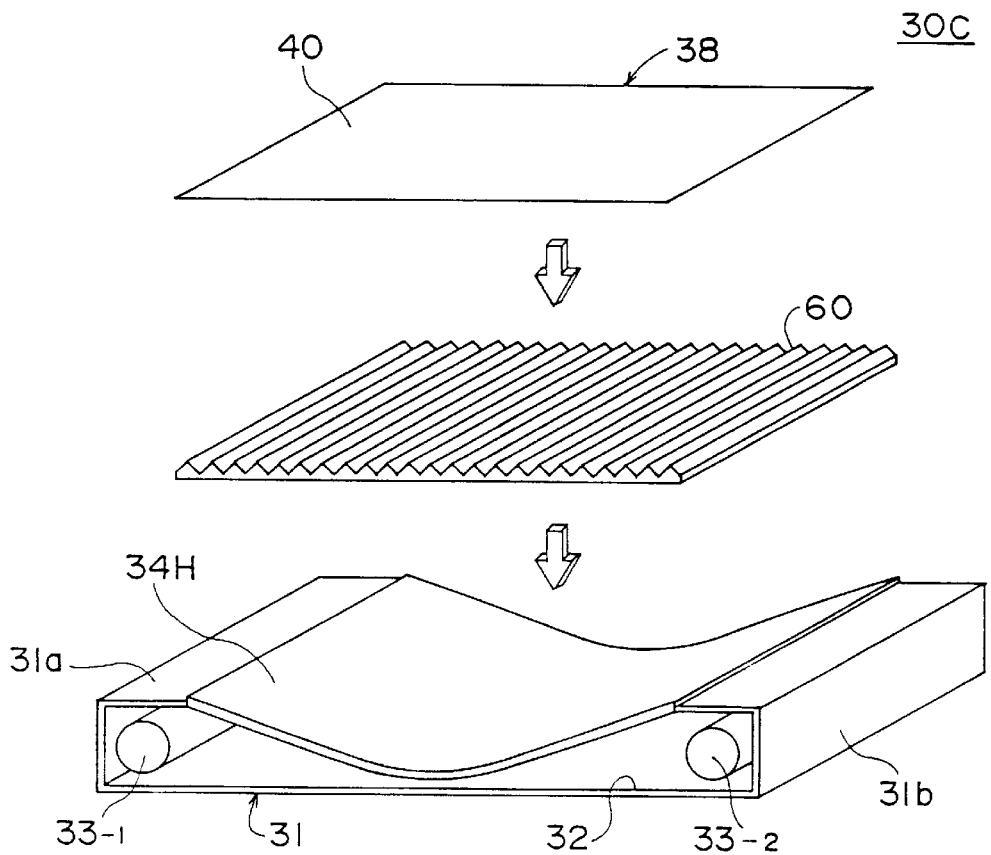
FIG. 18 is a diagram illustrating the surface light source unit according to a fourth embodiment of the present invention.

A surface light source unit according to a fourth embodiment of the present invention is formed as shown in FIG. 18.

Referring to FIG. 18, the curved prism plate 34H and the body 31 having the holders 31a and 31b in which the cold-cathode lamps 33-1 and 33-2 are mounted are assembled in the same manner as those shown in FIG. 16. A converging prism plate 60 is formed on the surface of the curved prism plate 34H, and the light diffusion plate 38 is fixed on the surface of the converging prism plate 60. The converging prism plate 60 is formed clear polycarbonate resin. Slender prisms, in each of which the vertical angle Θ is 90°, are formed on a prism surface of the converging prism plate 60. The thickness of the converging prism plate 60 is, for example, equal to 0.36 mm.

The converging prism plate 60 refracts the light emitted through the curved prism plate 34H so that the light is perpendicularly incident to the light diffusion plate 38. As a result, the lighting surface 40 is brighter than that of the surface light source unit shown in FIG. 16.

Figure 19:
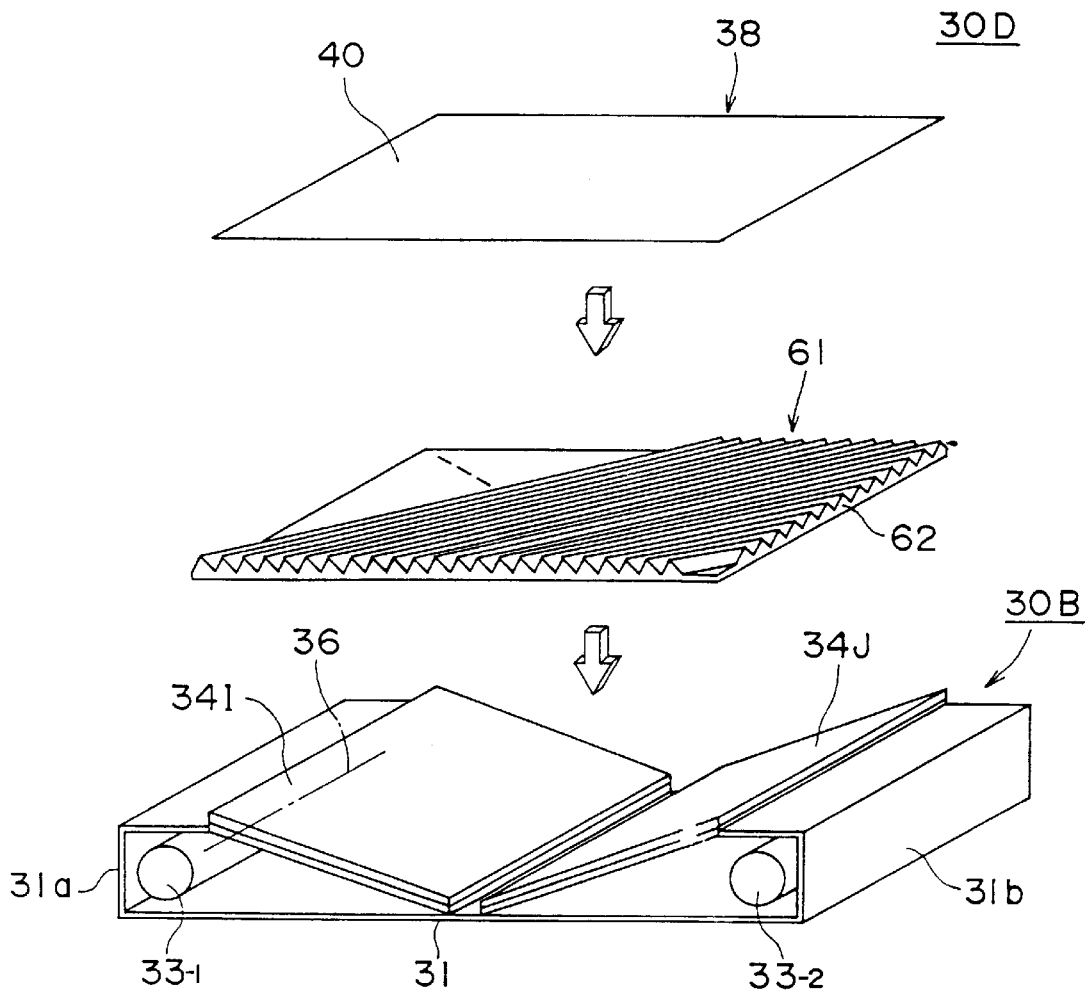
FIG. 19 is a diagram illustrating the surface light source unit according to a fifth embodiment of the present invention.

A surface light source unit according to a fifth embodiment of the present invention is shown in FIG. 19.

Referring to FIG. 19, the prism plates 34I and 34J and the body having the holders 31a and 31b in which the cold-cathode lamps 33-1 and 33-2 are mounted are assembled in the same manner as those shown in FIG. 17. A converging prism plate 61 is formed on the surface of the prism plates 34I and 34J, and the diffusion plate 38 is fixed on the converging prism plate 61. A direction in which each of linear prisms 62 formed on the converging prism plate 61 extend is inclined by about 45° with respect to the direction in which each of the cold-cathode lamps 33-1 and 33-2 extends.

Figure 20:
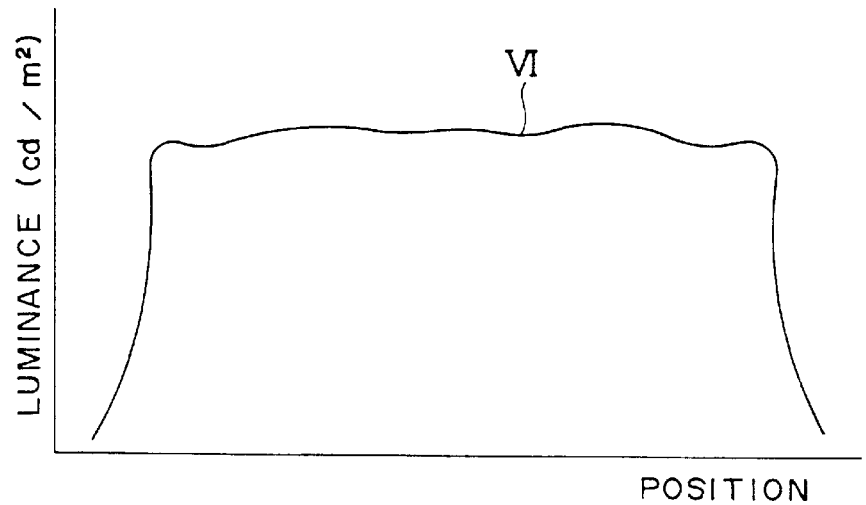
FIG. 20 is a graph illustrating the brightness distribution on the lighting surface of the surface light source unit shown in FIG. 19.

The brightness distribution on the lighting surface 40 of the surface light source unit having a 8 mm thickness (this thickness corresponding to the thickness of each of holders of the cold-cathode lamps 33-1 and 33-2), the lighting surface 40 having a lighting area of 165 mm×225 mm, is shown in FIG. 20. The brightness of the lighting surface 40 is almost uniform and has a high level, as shown by a curve VI in FIG. 20.

Figure 21:
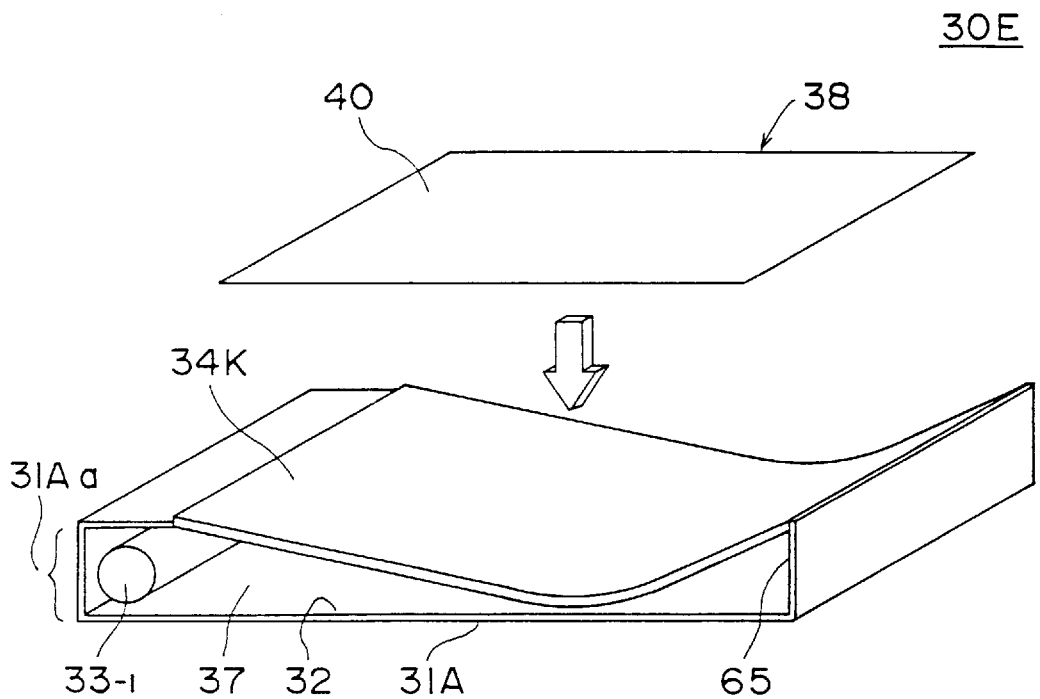
FIG. 21 is a diagram illustrating the surface light source unit according to a sixth embodiment of the present invention.

A surface light source unit according to a sixth embodiment of the present invention is shown in FIG. 21.

Referring to FIG. 21, the body 31 has a holder 31Aa formed at an end of the first reflector 32, in which holder 31Aa the cold-cathode lamp 33-1 is mounted, and a second reflector 65 provided at an opposite end of the first reflector 32 so that the second reflector 65 faces the cold-cathode lamp 33-1. A curved prism plate 34K is provided between the holder 31Aa and the second reflector 65.

In this surface light source unit 30E having the single cold-cathode lamp 33-1, the light which reaches the second reflector 65 is reflected thereby so as to return into the space 37. Thus, the second reflector 65 functions as a pseudo-light-source.

Figure 22:
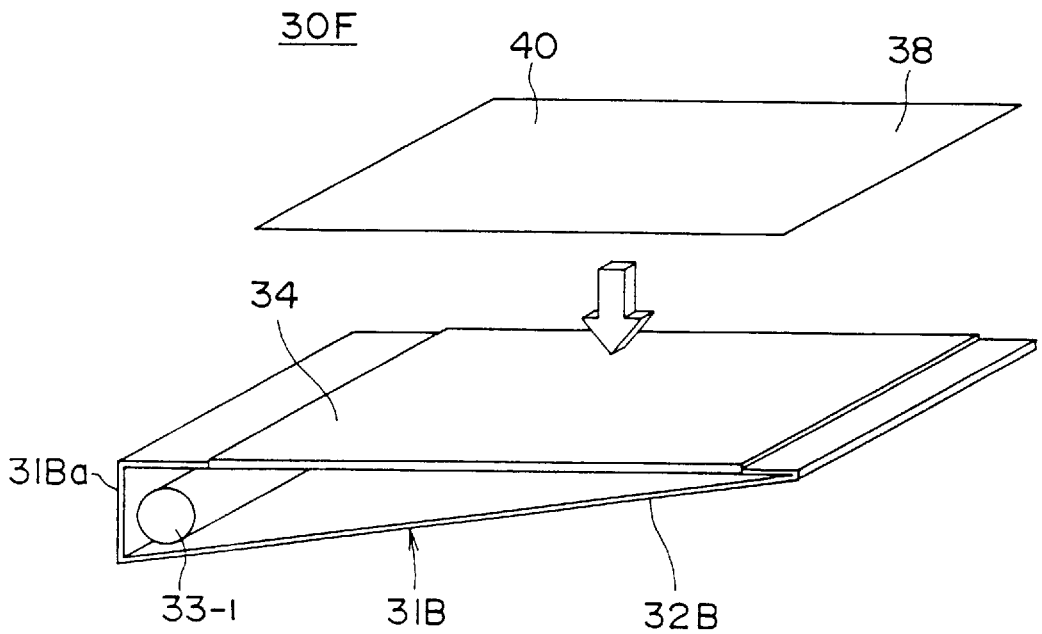
FIG. 22 is a diagram illustrating the surface light source unit according to a seventh embodiment of the present invention.

A surface light source unit according to a seventh embodiment of the present invention is shown in FIG. 22.

Referring to FIG. 22, a surface light source unit 30F has a body 31B formed of a reflector 32B and a holder 31Ba provided at an end of the reflector 32B, in which holder 31Ba the cold-cathode lamp 33-1 is mounted, and the prism plate 34. Side ends of the prism plate 34 are supported by the holder 31Ba and an end of the reflector 32B opposite to the end at which the holder 31Ba is provided, so that the space between the prism plate 34 and the reflector 32B becomes continuously narrower with going away (i.e., at increased distances) from the cold-cathode lamp 33-1. The prism plate 34 is flat and the light diffusion plate 38 is formed on the prism plate 34.

The surface light source unit 30F shown in FIG. 22 can be thinned.

Figure 23:
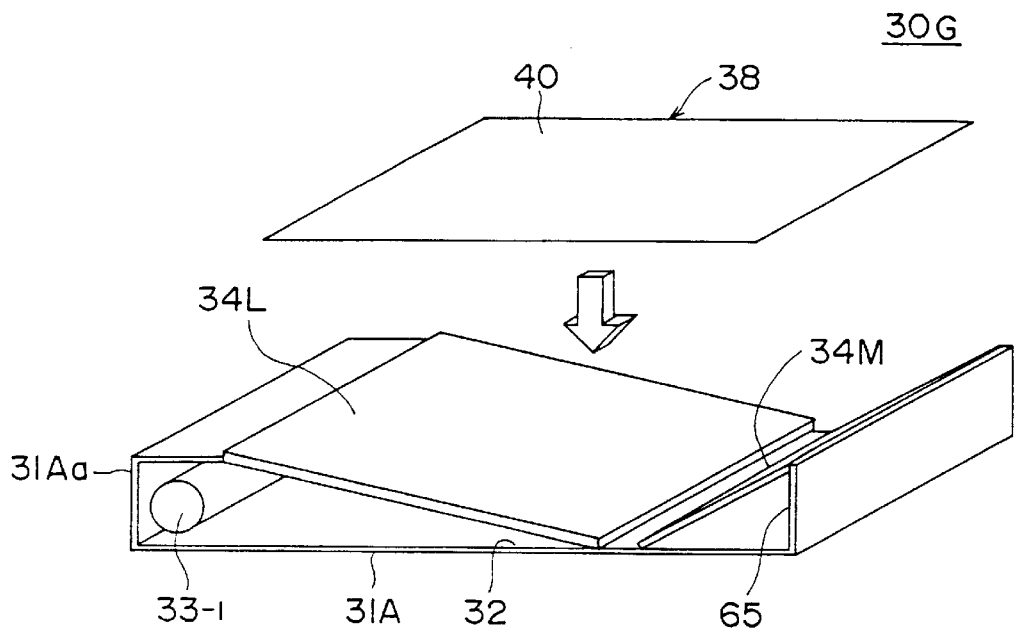
FIG. 23 is a diagram illustrating the surface light source unit according to an eighth embodiment of the present invention.

A surface light source unit according to a eighth embodiment of the present invention is shown in FIG. 23.

The curved prism plate 34k of the surface light source unit 30E shown in FIG. 21 is changed to two prism plate 34L and 34M, so that a surface light source unit 30G shown in FIG. 23 is formed. That is, in the surface light source unit 30G, ends of the prism plate 34L are supported by the holder 31Aa and the surface of the first reflector 32 and ends of the prism plate 34M are supported by the edge of the second reflector 65 and the surface of the first reflector 32 so that the prism plates 34L and 34M are inclined on the body 31A.

In the above embodiments (from the second embodiment to the eighth embodiment), any of the prism plates 34A, 34B, 34C, 34D, 34E, 34F, 34G shown in FIGS. 8, 9, 10, 11, 13, 14 and 15 may be used.

Each of the surface light source units described above may be used as a back light source unit of a display panel unit. In this case, a liquid crystal display panel is provided above or on the surface light source unit so that the liquid crystal display panel is lightened by the surface light source unit.

A description will now be given of a display panel unit according to an embodiment of the present invention.

Figure 24:
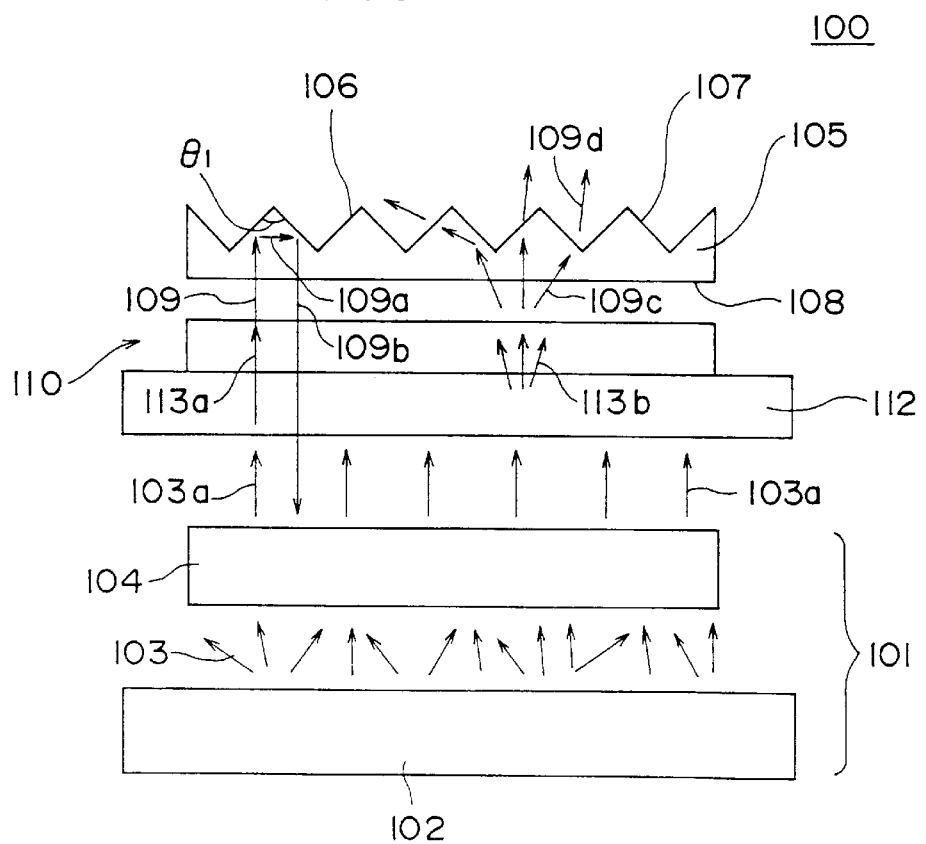
FIG. 24 is a diagram illustrating a display panel unit according to a first embodiment of the present invention.
Figure 25:
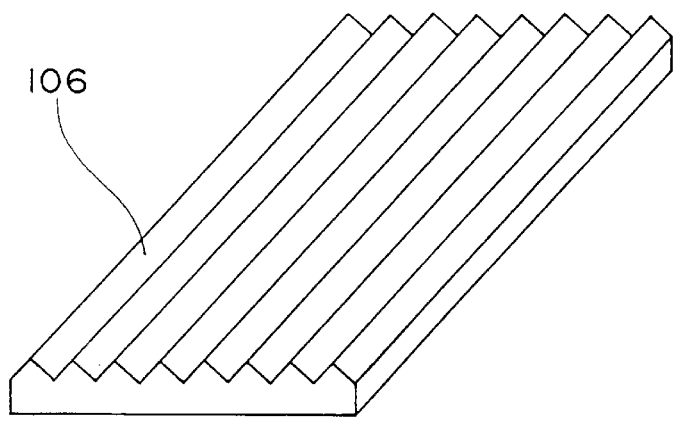
FIG. 25 is a perspective view illustrating the structure of a prism panel used in the display panel unit show in FIG. 24.

A display panel unit is formed as shown in FIG. 24. Referring to FIG. 24, a display panel unit 100 has a directional lighting source 101, a prism plate 105, and a polymer dispersed liquid crystal display element 112 which element is put between the directional lighting source 101 and the prism plate 105. The directional lighting source 101 has a back light panel 102 which is a surface light source and an optical fiber array 104. The optical fiber array 104 causes light 103 emitted from the back light panel 102 to have the directivity and emits directional light 103a. The prism plate 105 is formed as shown in FIG. 25. That is, a plurality of linear prisms 106 are closely arranged on the prism plate 105. The vertical angle Θ1 of each of the linear prisms 106 is 90°. A flat surface 108 of the prism plate 105 faces the liquid crystal display element 112, and a prism surface of the prism plate 105 on which the linear prisms 106 are formed is a lighting surface 107 of this display panel unit.

When light 109 which is not scattered is perpendicularly incident to the flat surface 108 of the prism plate 105, the light 109 is totally reflected by slanting surfaces of each of the linear prisms 106. As a result, the totally reflected light indicated by reference numbers 109a and 109b returns toward the directional lighting source 101. On the other hand, scattered light 109c is incident to the flat surface 108 of the prism plate 105, the scattered light 109c passes through the prism plate 105 and light 109d is emitted from the lighting surface 107. That is, the prism plate 105 has a function by which the light 109 which is not scattered is confined in a space under the prism plate 105 and the scattered light 109 passes.

The polymer distribution type liquid crystal display element 112 has a structure in which liquid crystal material is encapsulated by polymer micro capsules. In a region (a dot) to which a voltage is supplied, the liquid crystal molecules are neatly arranged, so that the light 103 incident to the region passes through the region as shown by a reference number 113a without being scattered. On the other hand, in a region (a dot) to which no voltage is supplied, the liquid crystal molecules are arranged at random, so that the light 103 incident to the region is scattered as shown by a reference number 113b. That is, when no voltage is supplied to the liquid crystal display panel 112, the function of the prism plate 105 by which function the light is confined in the space under the prism plate 105 is canceled.

In the display panel unit 100 having the above structure, inactive areas on the lighting surface 107 is in a bright state, each of the inactive areas corresponding to the region of the liquid crystal display element 112 to which no voltage is supplied, and active areas on the lighting surface 107 is in a dark state, each of the active areas corresponding to the region of the liquid crystal display element 112 to which the voltage is supplied. Thus, a patterns having a contrast between the active areas which is in the dark state and the inactive areas which is in the bright state can be formed on the lighting surface 107. That is, due to controlling formation of the active and inactive areas, various images can be displayed on the lighting surface 107 of the display panel unit 100.

The liquid crystal display element 112 corresponds to means for partially adjusting the emission rate of the prism plate 105 (the active areas and the inactive areas).

Figure 26A:
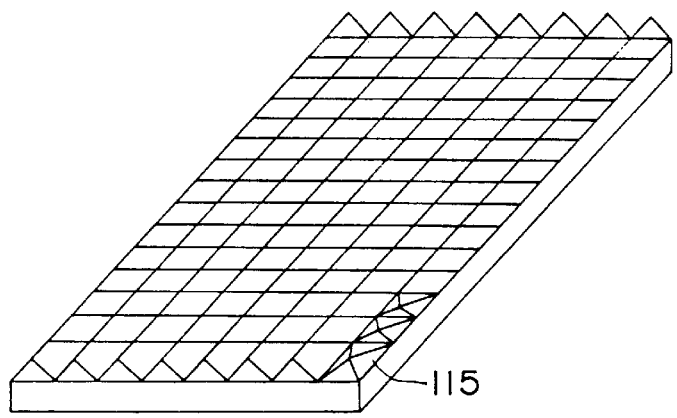
FIGS. 26A and 26B are perspective views illustrating a first modification of the prism panel.
Figure 26B:
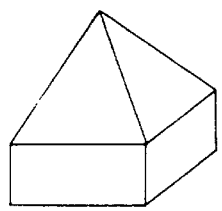

A prism plate 105A shown in FIG. 26A may be substituted for the prism plate 105 shown in FIG. 25. Referring to FIG. 26A, the prism plate 105A has a plurality of pyramid shaped prisms 115 as shown in FIG. 26B. The pyramid shaped prisms 115 are arranged on the prism surface of the prism plate 105A in a matrix.

Figure 27:
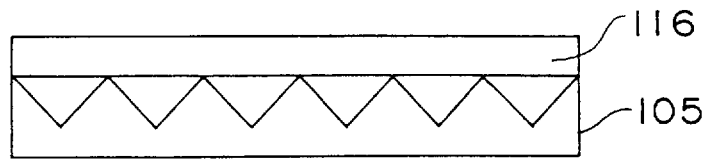
FIG. 27 is a diagram illustrating a second modification of the prism panel.

A prism plate assembly 105B shown in FIG. 27 may be also substituted for the prism plate 105 shown in FIG. 25. Referring to FIG. 27, the prism plate assembly 105 is formed of the prism plate shown in FIG. 25 and a light diffusion sheet 116 formed on the prism surface of the prism plate 105. The lighting surface is formed on the light diffusion sheet 116.

For example, a "Lexan film (8B36)" manufactured by GE CO., LTD. can be used as the light diffusion sheet 116.

Figure 28:
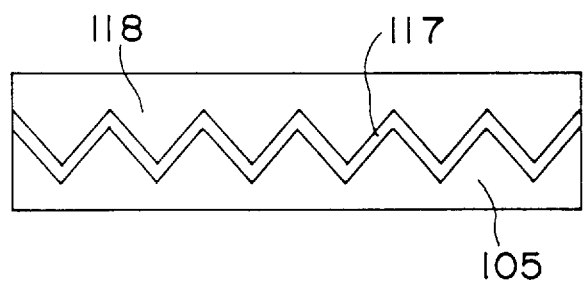
FIG. 28 is a diagram illustrating a third modification of the prism panel.

A prism plate assembly 105C shown in FIG. 28 may be also substituted for the prism plate 105 shown in FIG. 25. Referring to FIG. 28, the prism plate assembly 105C is formed of the prism plate 105 shown in FIG. 25, a resin layer 117 formed on the prism surface of the prism plate 105 and a light diffusion plate 118. The lighting surface is formed on the diffusion plate 118. The resin layer 117 is made of resin having a low refractive index.

In a case where either the prism assembly 105B or 115C is used in the display panel unit 100, the display panel unit 100 having a wide visual angle can be obtained.

Figure 29:
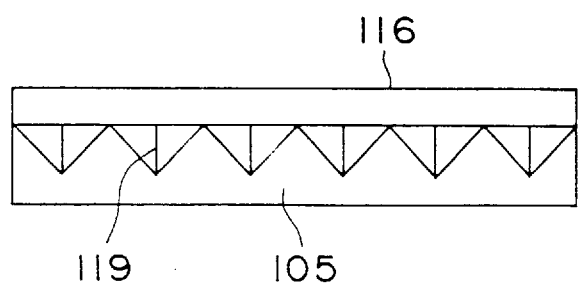
FIG. 29 is a diagram illustrating a fourth modification of the prism panel.

A prism plate assembly 105D shown in FIG. 29 may be also substituted for the prism plate 105 shown in FIG. 25. Referring to FIG. 29, shading walls 119 are formed in a structure of the prism plate 105 and the light diffusion sheet 116 so as to partition the prism plate assembly 105D into dots, each of the dots corresponding to one of regions of the liquid crystal display element 112 in which regions the supplying voltage can be controlled.

In a case where the prism assembly 105D shown in FIG. 29 is used in the display panel unit 100, the light from a bright dot is prevented from affecting dots close to the bright dot.

Figure 30:
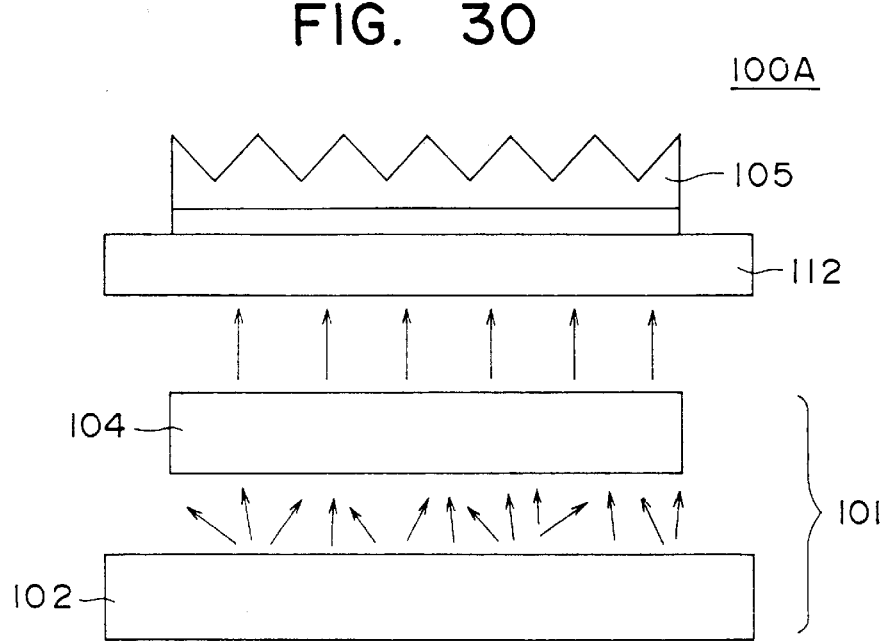
FIG. 30 is a diagram illustrating the display panel unit according to a second embodiment of the present invention.

A display panel unit according to another embodiment of the present invention is formed as shown in FIG. 30.

Referring to FIG. 30, a display panel unit 100A has the directional lighting source 101 formed of the back light 102 and the optical fiber array 104, the liquid crystal display element 112 and the prism plate 105. The liquid crystal display element 112 and the prism plate 105 are integrated with each other.

Figure 31:
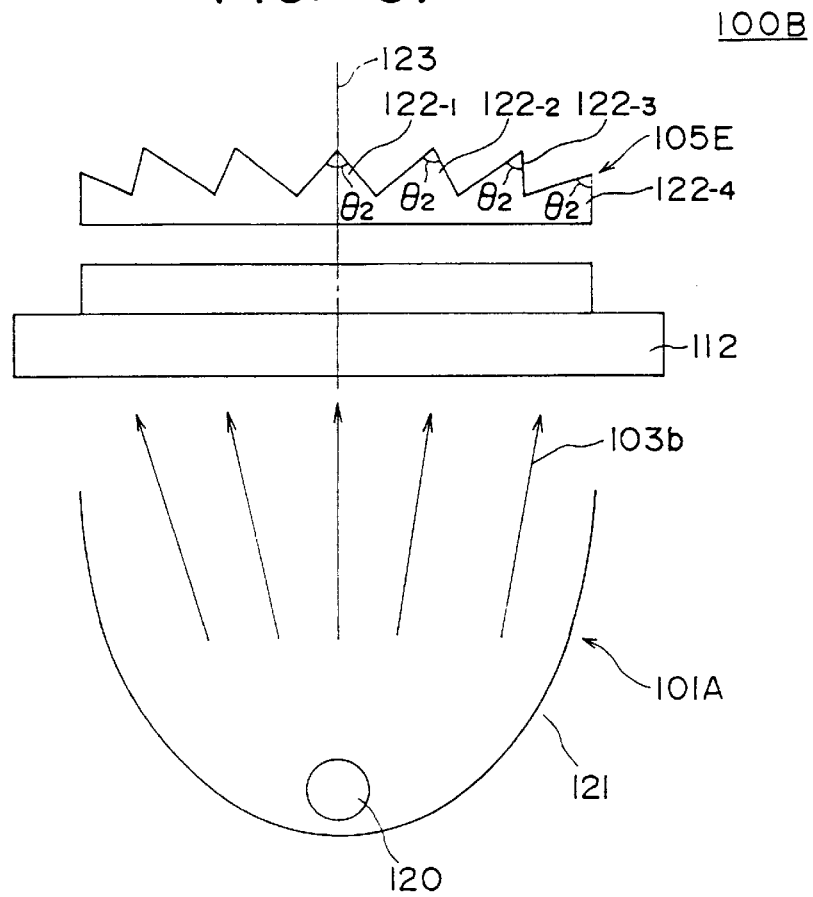
FIG. 31 is a diagram illustrating the display panel unit according to a third embodiment of the present invention.

A display panel unit according to another embodiment of the present invention is formed as shown in FIG. 31.

Referring to FIG. 31, a display panel unit 100B has a directional lighting source 101A, the liquid crystal display element 112 and a prism plate 105E. The directional lighting source 101A comprises a halogen lamp 120 and a reflector 121, so that light 103b having the directivity is emitted from the directional lighting source 101A. The prism plate 105E has prism elements 122-1, . . . , and 122-4. The degree of inclination of each of the prism elements 122-1, . . . and 122-4 to the outside is increased with going away from the center line 123 of the directional lighting source 101A. This structure of the prism elements 122-1, . . . , and 122-4 corresponds to slight diffusion of the light 103a emitted from the directional lighting source 101A.

The present invention is not limited to the aforementioned embodiments, and variations and modifications may be made without departing from the scope of the claimed invention.

What is claimed is:

1. A light emissive panel unit comprising:

light source means for emitting light;

a prism plate having first and second main surfaces, the light emitted by said light source means being incident on the first main surface, a first part of the incident light being reflected by the first main surface and a second part of the incident light passing through said prism plate and being emitted from the second main surface thereof; and adjusting means for adjusting the relative amounts of the first and the second parts of the incident light, and thereby the amount of light emitted from the second main surface of said prism plate, as a function of a distance of a location along the second main surface of said prism plate at which the emitted light is incident on the first main surface, said adjusting means being provided on the first surface of said prism plate.

2. The light emissive panel unit as claimed in claim 1, wherein said adjusting means adjusts the amount of incident light reflected by said prism plate as a function of the distance of the location, along the second main surface of said prism plate from the light source means, at which the emitted light is incident on the first main surface.

3. The light emissive panel unit as claimed in claim 2, wherein said adjusting means adjusts the relative amount of the first part to the second part of the incident light so as to cause the second part of the incident light, passing through said prism plate and being emitted from the second main surface thereof, to be of a substantially uniform intensity across the second main surface thereof.

4. The light emissive panel unit as claimed in claim 3, wherein said adjusting means is adjusting portions formed on said prism plate, each of said adjusting portions lowering a function of said prism plate by which function the light is reflected so that the amount of light passing through said prism plate is increased.

5. The light emissive panel unit as claimed in claim 4, wherein a number of adjusting portions formed in an area away from said light source means is greater than a number of adjusting means formed in an area near said light source means.

6. The light emissive panel unit as claimed in claim 4, wherein each of said adjusting portions is a small cylindrical block formed on said prism plate.

7. The light emissive panel unit as claimed in claim 4, wherein each of said adjusting portions is a small hole formed on said prism plate.

8. The light emissive panel unit as claimed in claim 4, wherein each of said adjusting portions is a small notch formed on said prism plate.

9. The light emissive panel unit as claimed in claim 4, wherein each of said adjusting portions is a flat surface portion formed on said prism plate.

10. The light emissive panel unit as claimed in claim 4, wherein each of said adjusting portions is a prism portion having a prism angle lower than that of each of said plurality of linear prisms, the prism angle being a base of each of the prism potion and said plurality of linear prisms.

11. The light emissive panel unit as claimed in claim 3, wherein said prism plate has a plurality of linear prisms formed a surface of said prism plate so as to extend in a predetermined direction, the surface being opposite to the surface from which the light is emitted.

12. The light emissive panel unit as claimed in claim 11, wherein said adjusting means is a structure in which a prism angle of each of said plurality of linear prisms is reduced with going away from said light source, the prism angle being a base angle of each of said plurality of linear prisms.

13. The light emissive panel unit as claimed in claim 3, wherein said light emissive panel unit has first and second opposite end portions, said prism plate extending therebetween, and said light source means includes a single cold-cathode lamp which is disposed at a corresponding one of said first and second end portions of said prism panel unit.

14. The light emissive panel unit as claimed in claim 13, wherein the cold-cathode lamp extends in a direction perpendicular to the predetermined direction in which said plurality of linear prisms extend.

15. The light emissive panel unit as claimed in claim 14, wherein said adjusting means is prism portion formed on the surface on which said plurality of linear prisms is formed, the prism portion extending in a direction perpendicular to the predetermined direction in which said plurality of linear prisms extend.

16. The light emissive panel unit as claimed in claim 3, wherein said prism plate is formed of a plurality of prism layers.

17. The light emissive panel unit as claimed in claim 3 wherein said adjusting means further comprises:

reflecting means for reflecting light and defining a space between the first main surface of said prism plate and said reflecting means, which space decreases progressively at distances progressively farther removed from the light source, wherein the light emitted from said light source means into the space between said prism plate and said reflecting means is repeatedly reflected by and between said first main surface of said prism plate and the reflecting means and thereby a first part of the incident light is confined in the space and a second part of the incident light is emitted from the second main surface of said prism plate.

18. The light emissive panel unit as claimed in claim 17, wherein said light emissive panel unit has first and second opposite end portions, said prism plate extending therebetween, and wherein said prism plate and said reflecting means are formed so that said space therebetween is reduced progressively at distances progressively farther away from said light source means.

19. The light emissive panel unit as claimed in claim 18, wherein said reflecting means comprises a substantially planar surface opposed to the first main surface of said prism plate and said prism plate is curved so that the space between said prism plate first main surface and said reflecting means is progressively smaller at distances progressively farther from said light source means.

20. This light emissive panel unit as claimed in claim 18, wherein said first main surface of said prism plate and said reflecting means comprise respective, planar surfaces inclined at a predetermined angle with respect to said reflecting means so that the space between said prism Plate main surface and said reflecting means is progressively smaller at distances progressively farther from said light source means.

21. The light emissive panel unit as claimed in claim 17, wherein said panel unit is of elongated configuration having first and second opposite ends, said reflecting means having a substantially planar surface extending between the first and second opposite ends of the panel unit, and said light source comprises a first lamp and a second lamp respectively disposed at the first and second opposite ends of the panel unit, and wherein said prism plate comprises first and second portions respectively inclined at predetermined angles with respect to said planar surface of said reflecting means so that corresponding spaces between the respective first and second portions and the planar surface of the reflecting means progressively decrease at progressively greater distances from said first and second lamps, at the respective, opposite ends of the panel unit, and toward a central portion of the panel unit.

22. The light emissive panel unit as claimed in claim 3 further comprising:

reflecting means for reflecting light and defining a space between the first main surface of said prism plate and said reflecting means, wherein the light emitted from said light source means into the space between the first main surface of said prism plate and the reflecting means and reflected by the reflecting means, and comprising the first part of the incident light, is confined in the space.

23. The light emissive panel unit as claimed in claim 1, further comprising a diffusion plate for diffusing light, disposed in spaced relationship to the second main surface of said prism plate and receiving the second part of the incident light which passes through the prism plate.

24. The light emissive panel unit as claimed in claim 1, wherein said light emissive unit forms a display panel unit in which the amount of light emitted from the surface of said prism plate is partially adjusted by said adjusting means so that image patterns are formed on the surface of said prism plate.

25. The light emissive panel unit as claimed in claim 24, wherein said adjusting means comprises a liquid crystal display element having first portions and second portions, light passing through the first portions and being diffused by the second portions.

26. The light emissive panel unit as claimed in claim 25, wherein said first main surface of said prism plate is in contact with said liquid crystal display element.

27. The light emissive panel unit as claimed in claim 24, wherein said light source means comprises a directional lighting source.

28. The light emissive panel unit as claimed in claim 24, wherein said prism plate has a plurality of linear prisms each of which extends in a predetermined direction.

29. The light emissive panel unit as claimed in claim 24, wherein said prism plate is a plurality of pyramid shaped prisms.

30. The light emissive panel unit as claimed in claim 24, further comprising a diffusion sheet for diffusing light, provided on said prism plate.

31. The light emissive panel unit as claimed in claim 1 further comprising a liquid crystal display panel for displaying dot images, said light emissive unit forming a display panel unit in which said liquid crystal display panel is lightened by the light emitted from said prism plate.

32. A light emissive panel unit comprising:

light source means for emitting light;

a prism plate having first and second main surfaces, the light emitted by said light source means being incident on the first main surface, a first part of the incident light being reflected by the first main surface and a second part of the incident light passing through said prism plate and being emitted from the second main surface thereof; and adjusting means for adjusting the relative amounts of the first and the second parts of the incident light, and thereby the amount of light emitted from the second main surface of said prism plate, as a function of the distance, along the second main surface of said prism plate from the light source means, at which the emitted light source is incident on the first main surface and so as to cause the second part of the incident light, passing through said prism plate and being emitted from the second main surface thereof, to be of a substantially uniform intensity across the second main surface thereof, said adjusting means further comprising reflecting means for reflecting light and defining a space between the first main surface of said prism plate and said reflecting means, which space decreases progressively at distances progressively farther removed from the light source, wherein the light emitted from said light source means into the space between said prism plate and said reflecting means is repeatedly reflected by and between said first main surface of said prism plate and the reflecting means and thereby a first part of the incident light is confined in the space and a second part of the incident light is emitted from the second main surface of said prism plate.

33. The light emissive panel unit as claimed in claim 32, wherein said light emissive panel unit has first and second opposite end portions, said prism plate extending therebetween, and wherein said prism plate and said reflecting means are formed so that said space therebetween is reduced progressively at distances progressively farther away from said light source means.

34. The light emissive panel unit as claimed in claim 33, wherein said reflecting means comprises a substantially planar surface opposed to the first main surface of said prism plate and said prism plate is curved so that the space between said prism plate first main surface and said reflecting means is progressively smaller at distances progressively farther from said light source means.

35. This light emissive panel unit as claimed in claim 33, wherein said first main surface of said prism plate and said reflecting means comprise respective, planar surfaces inclined at a predetermined angle with respect to said reflecting means so that the space between said prism plate main surface and said reflecting means is progressively smaller at distances progressively farther from said light source means.

* * * * *

UNITED STATES PATENT AND TRADEMARK OFFICE
CERTIFICATE OF CORRECTION

PATENT NO. : 5,863,114
DATED : January 26, 1999
INVENTOR(S) : Shinpei NAGATANI et al.

It is certified that error appears in the above-identified patent and that said Letters Patent is hereby corrected as shown below:

Col. 11, line 59, change "potion" to --portion--.

Col. 12, line 54, change "Plate" to --plate--.

Signed and Sealed this

Tenth Day of August, 1999

Attest:

Q. TODD DICKINSON

Attesting Officer

Acting Commissioner of Patents and Trademarks